United States Patent [19]

Vahala et al.

[11] Patent Number: 5,504,771
[45] Date of Patent: Apr. 2, 1996

[54] FIBER-OPTIC RING LASER

[75] Inventors: Kerry J. Vahala, San Gabriel; Namkyoo Park, Pasadena; Jay W. Dawson, Studio City; Steve Sanders, Pasadena, all of Calif.

[73] Assignee: California Institute of Technology, Pasadena, Calif.

[21] Appl. No.: 971,080

[22] Filed: Nov. 3, 1992

[51] Int. Cl.$^6$ ........................................ H01S 3/083
[52] U.S. Cl. ............................... 372/94; 356/350; 372/6; 372/20
[58] Field of Search ........................... 372/6, 20, 92–94; 356/350

[56] References Cited

U.S. PATENT DOCUMENTS

| | | | |
|---|---|---|---|
| 4,955,025 | 9/1990 | Mears et al. | 372/6 |
| 5,132,976 | 7/1992 | Chung et al. | 372/6 |
| 5,181,210 | 1/1993 | Chung et al. | 372/6 |

OTHER PUBLICATIONS

All Fiber, Low–Threshold, Widely Tunable Single–Frequency, Erbium–Doped Fiber Ring Laser With A Tandem Fiber Fabry–Perot Filter, by N. Park et al., Applied Physics Letters 59 (19), Nov. 4, 1991; pp. 2369–2371.

Measurements Of The Intensity Noise Of A Broadly Tunable, Erbium–Doped Fiber Ring Laser, Relative To The Standard Quantum Limit, by S. Sanders et al., Applied Physics Letters 60 (21), May 25, 1992; pp. 2583–2585.

Semiconductor Lasers And Fiber Lasers For Fiber–Optic Telecommunications, by K. Vahala et al., AGARD Lecture Series No. 184 (Advances in Fiber Optic Technology Communications and For Guidance and Control), May 18, 1992; 8 pages.

Suppression Of Mode–Hopping In A Single–Longitudinal–Mode Erbium–Doped Fiber Laser Using Tandem Fiber Fabry–Perot Filters, by J. Dawson et al., Optical Fiber Communications Conference, Feb. 4, 1992.

Widely Tunable Narrow Linewidth Erbium Doped Fibre Ring Laser, by H. Schmuck et al., Electronics Letters, vol. 27, No. 23, Nov. 7, 1991, pp. 2117–2119.

Laser–Diode–Pumped Neodymium–Doped Fiber Laser With Output Power>1W, by J. Minelly et al., Conference Of Lasers And Electro–Optics, May 11, 1992.

An Electronically Tunable Fiber Laser With A Liquid–Crystal Etalon Filter As The Wavelength–Tuning Element, by M. Maeda et al., IEEE Photonics Technology Letters, vol. 2, No. 11, Nov. 1990, pp. 787–789.

Electrically Tunable, Diode–Pumped Erbium–Doped Fibre Ring Laser With Fibre Fabry–Perot Etalon, by J. Zyskind et al., Electronics Letters, vol. 27, No. 21, Oct. 10, 1991, pp. 1950–1951.

Single–Frequency Travelling–Wave Erbium–Doped Fibre Loop Laser, by G. Cowle et al., Electronics Letters, vol. 27, No. 3, Jan. 31, 1991, pp. 229–230.

Singlemode Diode–Pumped Tunable Erbium–Doped Fibre Laser With Linewidth Less Than 5.5 kHz, by J. Zyskind et al., Electronics Letters, vol. 27, No. 23, Nov. 7, 1991, pp. 2148–2149.

(List continued on next page.)

Primary Examiner—John D. Lee
Attorney, Agent, or Firm—Poms, Smith, Lande & Rose

[57] ABSTRACT

A single-frequency fiber-optic ring laser exhibits improved frequency stability, reduced laser intensity noise, broad tunability and narrow linewidth. The fiber-optic ring laser includes a ring-resonator with a length of single-mode optical fiber, a gain medium of rare earth-doped fiber, a broad-band fiber Fabry-Perot filter for wavelength tuning of the laser, a narrow-band fiber Fabry-Perot filter for suppression of longitudinal ring modes and an optical isolator for preventing interetalon interactions between the tandem fiber Fabry-Perot filters. Selective positioning of the tandem fiber Fabry-Perot filters, relative to the ring laser's gain medium and output coupler, results in laser intensity noise reduction to the standard quantum limit.

62 Claims, 3 Drawing Sheets

OTHER PUBLICATIONS

Wavelength–Tunable Single–Frequency And Single–Polarisation Erbium–Doped Fibre Ring–Laser With 1.4 kHz Linewidth, by K. Iwatsuki et al., Electronics Letters, vol. 26, No. 24, Nov. 22, 1990, pp. 2033–2035.

Short Single Frequency Erbium–Doped Fibre Laser, by J. Zyskind et al., Electronics Letters, vol. 28, No. 15, Jul. 16, 1992, pp. 1385–1387.

Reduction Of Spatial Hole Burning By Singlephase Modulator in Linear $Nd^{3+}$ Fibre Laser, by H. Sabert et al., Electronics Letters, vol. 27, No. 23, Nov. 7, 1991, pp. 2176–2177.

Co–Lasing In An Electrically Tunable Erbium–Doped Fiber Laser, by J. Dawson et al., Applied Physics Letters 60 (25) Jun. 22, 1992, pp. 1–5.

Fiber Fox–Smith Resonators: Application To Single–Longitudinal–Mode Operation of Fiber Lasers, by P. Barnsley et al., Journal of the Optical Society of America A, vol. 5, No. 8, Aug. 1988, pp. 1339–1346.

Acoustically Tuned Erbium–Doped Fiber Ring Laser, by D. A. Smith et al., Optics Letters, vol. 16, No. 6, Mar. 15, 1991, pp. 387–389.

An Improved Delayed Self–Heterodyne Interferometer For Linewidth Measurements, by J. W. Dawson et al., IEEE Photonics Technology Letters, vol. 4, Sep. 1992, 15 pages.

Linewidth and Frequency Jitter Measurement Of An Erbium–Doped Fiber Ring Lawer Using A Loss–Compensated, Delayed Self–Heterodyne Interferometer, by N. Park et al., Optics Letters, vol. 17, Sep. 15, 1992, 13 pages.

Multiple Wavelength Operation Of An Erbium–Doped Fiber Laser, by N. Park et al., IEEE Photonics Technology Letters, vol. 4, No. 6, Jun. 1992, pp. 540–541.

Travelling–Wave Erbium Fibre Ring Laser With 60 kHz Linewidth, by P. Morkel et al., Electronics Letters, vol. 26, No. 10, May 10, 1990, pp. 632–634.

FIBER-OPTIC RING LASER

BACKGROUND OF THE INVENTION

This invention was made with Government support under Office of Naval Research Contract No. N00014-91-J-1524 and National Science Foundation Contract No. DMR-885-8228. The U.S. Government has certain rights in the invention.

FIELD OF THE INVENTION

This invention relates to fiber-optic lasers and amplifiers in general and specifically to single-frequency fiber-optic ring lasers exhibiting improved frequency stability, reduced laser intensity noise, broad tunability and narrow linewidth.

DESCRIPTION OF THE PRIOR ART

Single-frequency, low threshold, widely tunable laser operation at or near the 1.5 μm window has potential applications in optical fiber communications, fiber sensing, and spectroscopy systems. Semiconductor lasers, primarily because of their ability to provide high speed, direct current modulation and their relatively low cost per component, have achieved substantial success as sources and oscillators in fiber optic telecommunications systems. Nevertheless, semiconductor lasers exhibit problems with frequency stability, tuning range, intensity noise and large linewidths in connection with their fiber optic communications applications. Also, they have an inherent shortcoming in that they are an optical source whose light is generated outside of an optical fiber, thereby presenting packaging-related problems when they are used in optical fiber communications applications.

One group of promising candidates for use in fiber communications, fiber sensing, and spectroscopy systems are rare earth-doped fiber lasers. In particular, erbium-doped fiber lasers have recently received considerable attention in this regard. However, primarily because of the use of discrete optical components as part of the laser system, most fiber lasers examined to date have suffered from a number of problems making them unsuitable for fiber-optic communications applications. These problems have included large cavity losses, thereby requiring large threshold pump powers, relatively small wavelength tuning range, severe mode hopping and high laser intensity noise levels.

Thus, there is a need to provide a laser that is all-fiber in nature, thereby providing a source of coherent optical radiation generated within an optical fiber and promoting compatibility with fiber-optic communications systems.

Also, there is a need to provide a laser source that exhibits low cavity losses and therefore can be operated on low threshold pump power.

Further, a need exists to provide a laser source that is single frequency and widely tunable over a range useful in fiber-optic telecommunications, fiber sensing, and spectroscopy applications.

In addition, a need exists to provide a laser source in which mode hopping is significantly suppressed or eliminated and in which intensity noise is greatly reduced.

SUMMARY OF THE INVENTION

Accordingly, one object of the present invention is to provide an all-fiber laser, thereby providing a source of coherent optical radiation generated within an optical fiber and promoting compatibility with fiber optic communications systems.

A further object of the present invention is to provide a laser source that exhibits low cavity losses and can therefore be operated on low threshold pump power.

Another object of the present invention is to provide a laser source that is single frequency and widely tunable over a wavelength range useful in fiber optic telecommunications, fiber sensing, and spectroscopy applications.

Yet another object of the present invention is to provide a laser source in which mode-hopping between side-modes is significantly suppressed or eliminated and in which laser intensity noise is greatly reduced. In accomplishing these and other objects, there is provided a fiber-optic ring laser comprising a fiber ring-resonator including a length of optical fiber, a gain module, and first and second faber Fabry-Perot filters or etalons. The optical faber is single-mode in configuration. The gain module comprises a rare earth-doped faber, with erbium ions being the preferred, but not the only possible dopant. The first faber Fabry-Perot filter is a broad-band falter that is electronically tunable to provide a wavelength selection element in the ring-resonator. The second fiber Fabry-Perot falter is a narrow-band filter and provides sufficient side-mode suppression to fully stabilize the ring-resonator and provide single longitudinal mode lasing. The second fiber Fabry-Perot filter may also be electronically tunable if desired. A pumping source is coupled to the ring-resonator to input energy into the gain module and thereby achieve gain in the ring-resonator. The fiber Fabry-Perot filters allow for a low threshold pumping power to initiate lasing action in the ring-resonator. Also included in the ring-resonator is a polarization-independent isolator introduced between the two fiber Fabry-Perot filter to prevent interetalon interactions and additional isolators to ensure unidirectional operation of the ring laser. Further, an output coupler is used to couple the ring-resonator's laser emission out of the resonator. A polarization controller and polarizer are also used to maintain a desired lasing polarization state. Alternatively, polarization-maintaining single-mode fiber may be used to maintain a desired lasing polarization state. Selective positioning of the output coupler, the two Fabry-Perot filters and the gain module within the ring-resonator results in a ring laser whose intensity noise can be reduced towards the standard quantum limit.

Other objects, characteristics and advantages of the present invention will become apparent from a consideration of the following detailed description with reference to the accompanying drawings.

DETAILED DESCRIPTION OF THE INVENTION

Figure 1:
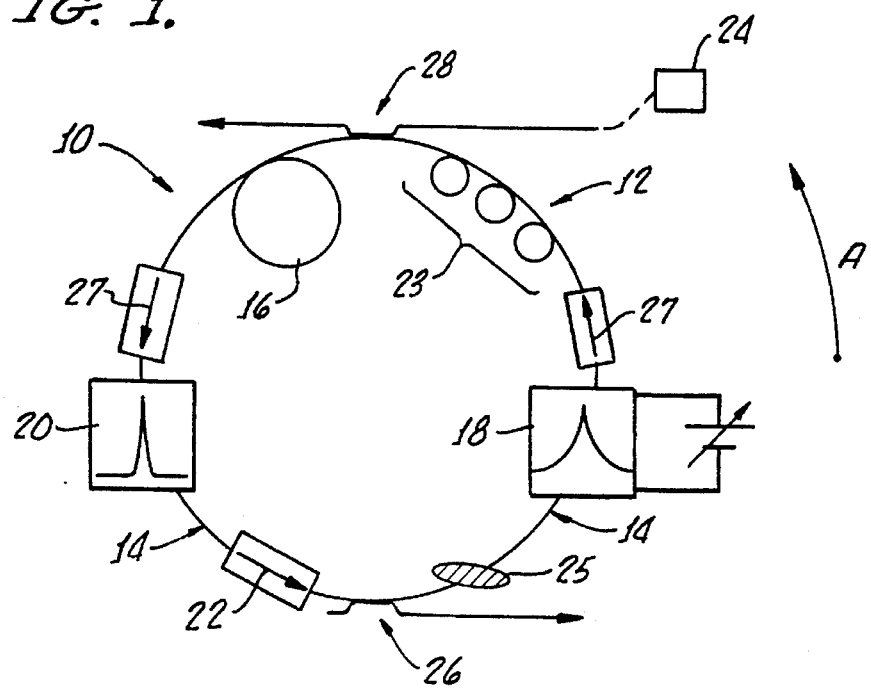
FIG. 1 is a schematic representation of a preferred embodiment of the improved fiber-optic ring laser comprising the present invention.

Referring now to the drawings, a schematic representation of the fiber-optic ring laser 10 comprising the present invention is shown in FIG. 1. Ring laser 10 includes a ring-like resonator 12 through which optical radiation travels unidirectionally as shown by arrow A. Ring-resonator 12 includes single-mode optical fiber 14, gain module 16, first and second fiber Fabry-Perot filters 18, 20, polarization-independent isolator 22, polarizer 25, polarization controller 23 and isolators 27. Also shown are pumping source 24 and ring-resonator output coupler 26.

Pumping source 24 may be any one of a variety of coherent radiation sources known in the art including laser diodes and solid state lasers. In the embodiment shown in FIG. 1, the output from pumping source 24 is coupled into ring-resonator 12 through a wavelength division multiplexer 28. However, coupling into ring-resonator 12 is not limited to this method and may be accomplished through any one of the methods generally known in the art.

Gain module 16 includes a length of rare earth doped fiber. In the preferred embodiment gain module 16 consists of an erbium doped fiber having a low level uniform concentration of erbium ions of approximately 50 ppm and a 5 μm core diameter. However, a variety of other rare earth and transition metal doped materials may be used in a wide variety of concentrations and fiber core configurations. Also, a semi-conductor optical amplifier could be used as gain module 16.

First fiber Fabry-Perot filter 18 is a broad-band filter and acts as a wavelength selective element in ring-resonator 12. First filter 18 is electronically tunable to provide stimulated emission wavelengths from ring-resonator 12 in the range from about 1530 nm to 1560 nm. As described more fully below, use of broad-band fiber Fabry-Perot filter 18 leads to improved threshold pumping performance as compared to other wavelength tuning approaches demonstrated to date.

Second fiber Fabry-Perot filter 20 is narrow-band in nature and, as explained more fully below, when used in tandem with first fiber Fabry-Perot filter 18 results in side-mode oscillations in resonator 12 being significantly suppressed or eliminated, thereby completely eliminating mode-hopping in ring laser 10. Also, through selective positioning in ring-resonator 12 relative to broad-band fiber Fabry-Perot filter 18, gain module 16 and output coupler 26, narrow-band fiber Fabry-Perot filter 20 can reduce the laser noise intensity of fiber-optic ring laser 10 towards the standard quantum limit.

Figure 2:
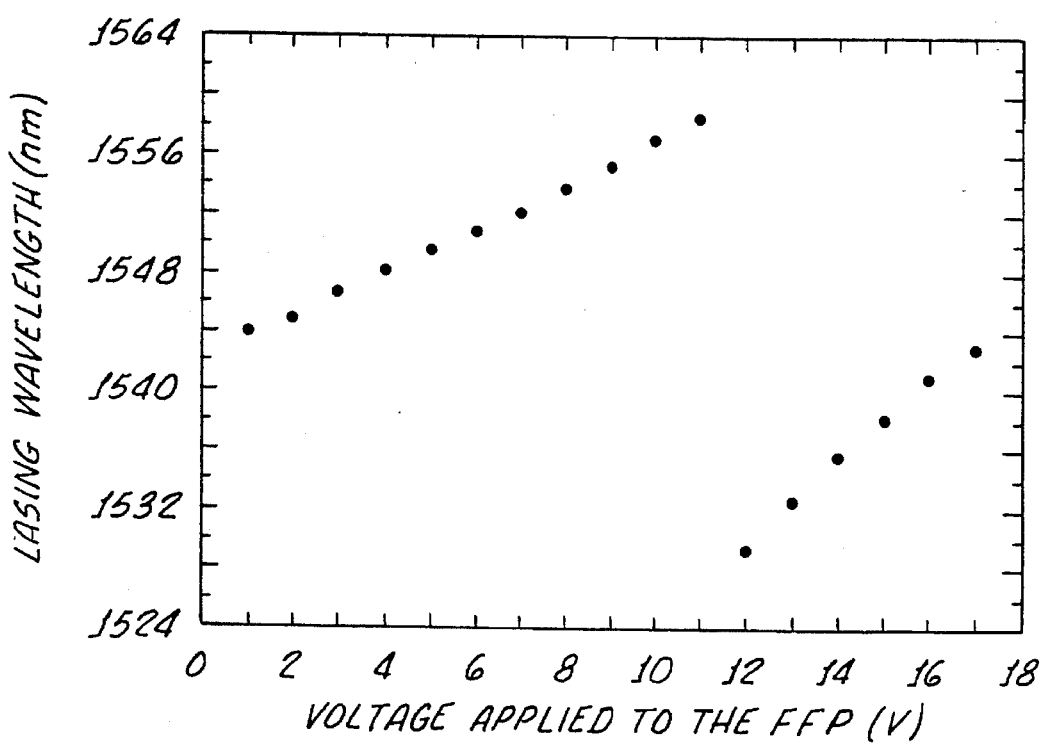
FIG. 2 is a graph of experimentally determined wavelength tunability of the preferred embodiment of the present invention schematically represented in FIG. 1.

Regarding investigation of the frequency tuning and side-mode suppression characteristics of the present invention, the following experimental approach was utilized. An optical radiation pumping source 24 was used comprising 980 nm output radiation from a titanium:sapphire laser. This output was coupled into ring-resonator 12 through a wavelength division multiplexer 28 with a coupling efficiency of approximately 50%. Total resonator length was approximately 30 meters. Gain module 16 was a 4.5 meter long piece of aluminum-codoped erbium fiber (50 ppm, 5 μm core diameter). First fiber Fabry-Perot filter 18 acted as a wavelength selection element and had a 26.1 gigahertz (GHz) (0.196 nm at 1.5 μm) bandwidth at full-with-half-maximum (FWHM) and a 4020 GHz free spectral range (FSR). Tuning of first fiber Fabry-Perot filter 18, and thus of fiber-optic ring laser 10, was possible by changing the voltage on first fiber Fabry-Perot filter 18, thereby scanning the center frequency of first fiber Fabry-Perot filter 18 over a different longitudinal mode of fiber-optic ring laser 10. FIG. 2 shows the tuning curve as a function of the applied voltage. Tuning over 30 nm, corresponding to the FSR of first fiber Fabry-Perot filter 18, between 1530–1560 nm was possible by applying 0–17 dc volts. These results were achieved prior to insertion of second fiber Fabry-Perot filter 20 into ring-resonator 12.

Next, second fiber Fabry-Perot filter 20, with a smaller bandwidth (125 MHz; 0.001 nm at 1550 nm) was placed in ting-resonator 12. In this tandem fiber Fabry-Perot filter configuration, the measured threshold pumping power of optical radiation pumping source 24 was about 14 milliwatts (mW). A polarization controller 23 and polarizer 25 were included to maintain the desired lasing polarization state. Isolators 27 were included to ensure the desired unidirectional operation of ring-resonator 12. A polarization-independent isolator 22 was introduced between first and second fiber Fabry-Perot filters 18, 20 to prevent interetalon interactions, which had been observed to produce additional mode-hopping. With the polarization-independent isolator 22 in place, the resulting transmission function from the tandem fiber Fabry-Perot filters can be considered as the product of two independent transmission functions of the fiber Fabry-Perot filters. With the second fiber Fabry-Perot filter 20 in ting-resonator 12, tuning was again possible over a frequency range corresponding to the FSR of larger bandwidth first fiber Fabry-Perot filter 18. Mode-hopping was completely suppressed in this configuration due to the added frequency selection capability provided by second fiber Fabry-Perot filter 20. Instead, the lasing mode was observed to slowly drift until, after several minutes, oscillation would jump to an adjacent longitudinal mode of ring-resonator 12. The side-mode suppression ratio, measured by detecting the output using a high-frequency photo diode and then analyzing the resultant photo-current using a microwave spectrum analyzer, was found to be higher than 60 decibels (dB). Single-frequency operation stable for a period of several minutes was observed using the above-described tandem fiber Fabry-Perot filter configuration.

Figure 3:
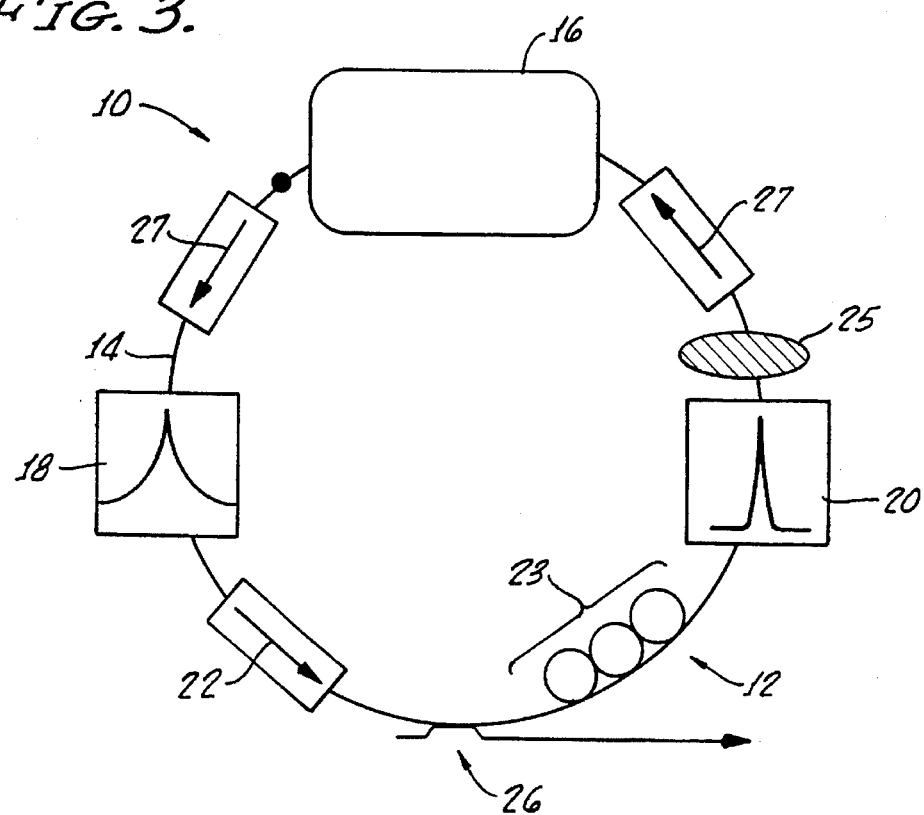
FIG. 3 is a schematic representation of an experimental configuration of a fiber-optic ring laser useful in illustrating the laser intensity noise reduction characteristics of the present invention.

Turning now to the laser intensity noise reduction aspects of the present invention, FIG. 3 is a schematic of an experimental configuration of a fiber-optic ring laser useful in illustrating the principles of the present invention. FIG. 3 depicts, with slightly different geometry, the unidirectional, fiber-optic ring laser 10 shown in FIG. 1, including ring-resonator 12, optical fiber 14, gain module 16, first and second fiber Fabry-Perot filters 18, 20, polarization-independent isolator 22, polarization controller 23, polarizer 25, isolators 27, and output coupler 26. FIG. 1's configuration differs from FIG. 3 in that second fiber Fabry-Perot filter 20 has been placed just prior to output coupler 26 to pre-filter the lasing field before being emitted from ting-resonator 12. A comparison of the laser noise intensity measurements of the fiber-optic ring laser configurations depicted in FIGS. 3 and 1, demonstrates that the fiber-optic ring laser of the present invention, schematically represented in FIG. 1, provides intensity noise reduction to the standard quantum limit, whereas the configuration represented in FIG. 3 does not. This intensity noise reduction is attributed to intracavity spectral filtering provided by selective positioning of second fiber Fabry-Perot filter 20 within ring-resonator 12.

Figure 4:
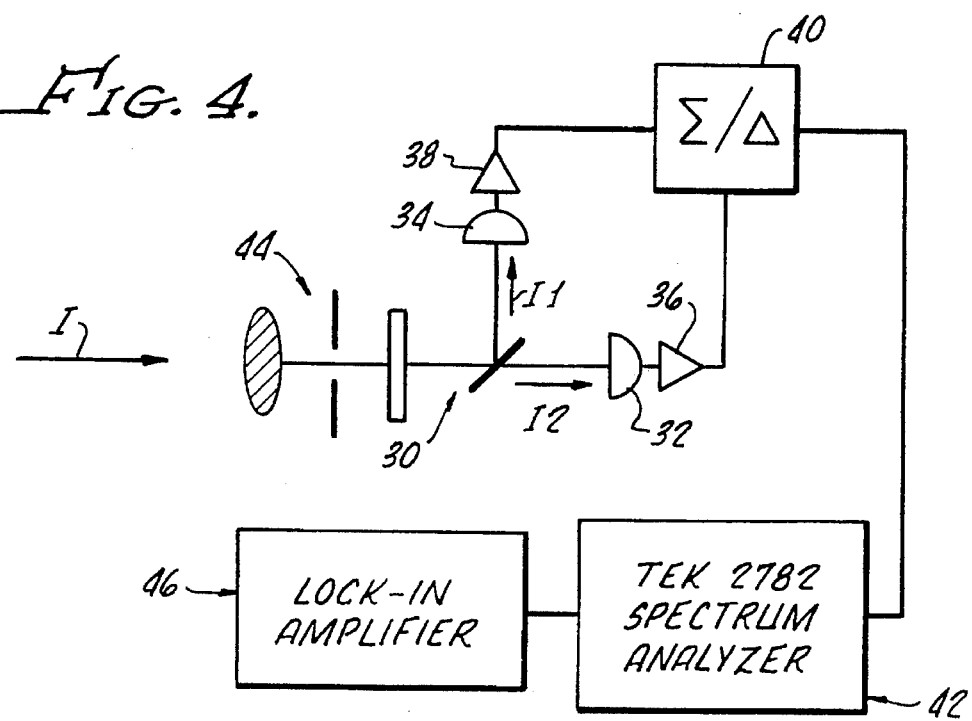
FIG. 4 is a schematic representation of a balanced homodyne detector (BHD) system for measuring fiber-optic ring laser intensity noise.

More specifically, in an experimental configuration, laser intensity noise measurements were made using a balanced homodyne detector (BHD) system as illustrated in FIG. 4. In this system, a beam splitter 30 separates an incident optical beam, represented here as I, into two beams, represented here as $I_1$ and $I_2$, that are subsequently detected on high quantum efficiency PIN diodes, 32, 34. The resultant photo-currents are amplified by amplifiers 36, 38 and passed through a hybrid junction 40 which, depending on its configuration, either adds or subtracts the photo-currents. A spectrum analyzer 42 is then used to measure the spectral density of the photo-current power. A chopper 44 and lock-in amplifier 46 may be used to improve detection sensitivity and eliminate thermal noise. When hybrid junction 40 is configured for photo-current addition, the resultant microwave spectrum is proportional to the laser intensity noise spectrum. When hybrid junction 40 is configured for photo-current subtraction, however, careful balancing of the BHD produces a quantum-limited microwave spectrum resulting purely from the corpuscular nature of the optical carrier. This yields the standard quantum limit of the system.

Using the BHD system described above and depicted in FIG. 4, an intensity noise approximately 20 dB above the standard quantum limit was measured for the fiber-optic ring laser schematically shown in FIG. 3. Further, as seen in FIG. 5, a linear dependence of noise power on laser output power was observed, suggesting that the origin of FIG. 3's system's noise was beating of weakly excited side or longitudinal ring modes with the main lasing mode.

This was confirmed by performing intensity noise measurements on the fiber-optic ring laser of the present invention schematically represented in FIG. 1. Measurements were made at a variety of output coupling values and compared to similar measurements on the fiber-optic ring laser schematically represented in FIG. 3. For purposes of laser intensity noise reduction, the present invention, depicted in FIG. 1, has its second, narrow-band fiber Fabry-Perot filter 20 placed in a different configuration than that depicted in FIG. 3's laser. FIG. 1's configuration results in side or longitudinal ring modes spaced by more than half of narrow-band fiber Fabry-Perot filter 20's FWHM being strongly attenuated with a corresponding reduction of beat noise.

Figure 5:
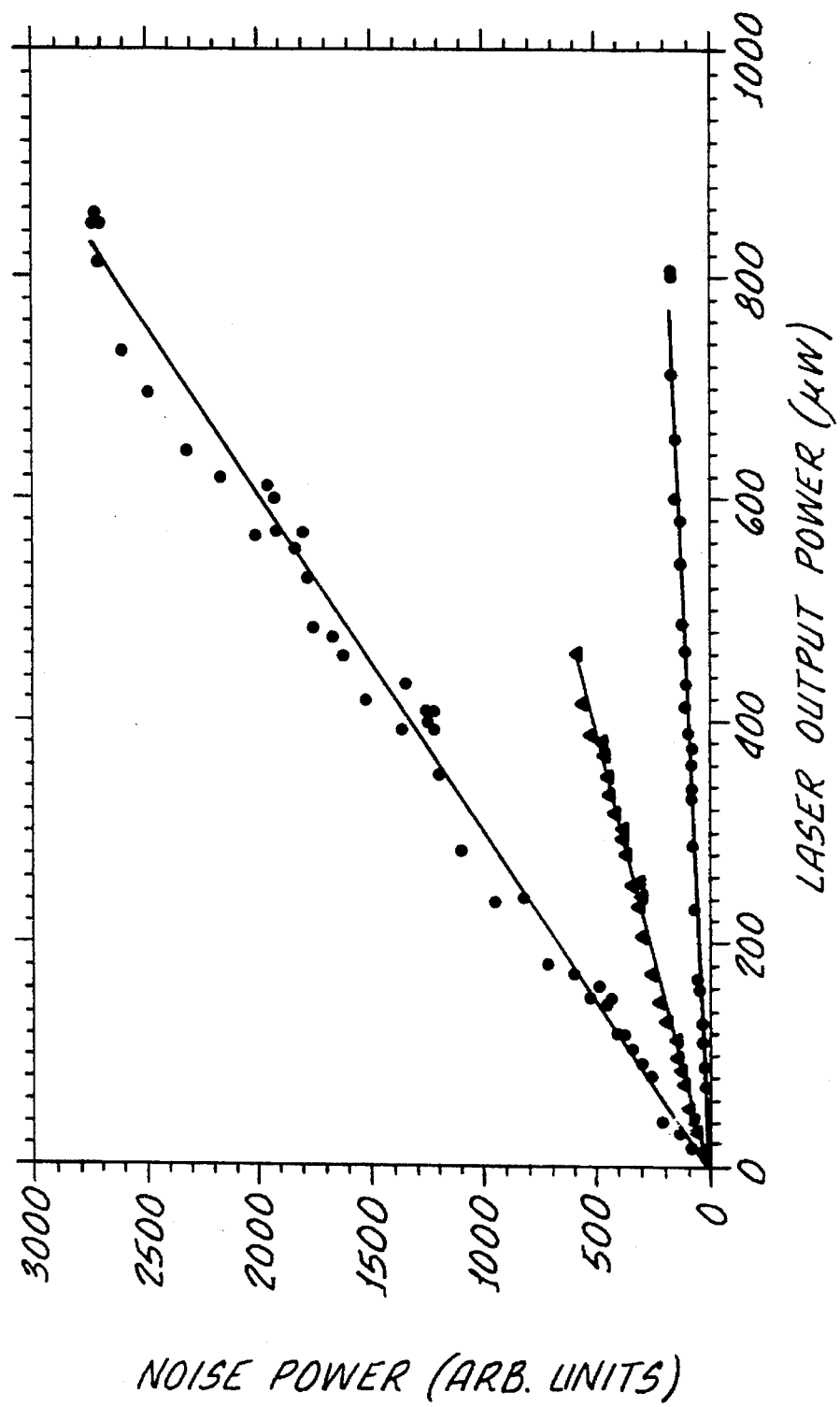
FIG. 5 is a graph of experimentally determined levels of noise power for various laser output powers of the fiber-optic ring lasers schematically represented in FIGS. 1 and 3.

FIG. 5 shows a comparison of noise power versus laser output power for the two configurations shown in FIGS. 1 and 3, with the measurements being performed at 310 MHz and an integration bandwidth of 100 kHz. The upper plot shows data measured using the configuration in FIG. 3, while the middle plot shows data collected from measurements of the configuration depicting the present invention in FIG. 1. The bottom plot shows the measured standard quantum limit. (The scale on the lower two plots has been magnified by 10× to make possible a comparison with the upper plot.) The results depicted in FIG. 5 demonstrate that the present invention's use of tandem fiber Fabry-Perot filters 18, 20, when selectively positioned in ring-resonator 12 with respect to gain module 16 and output coupler 26, results in laser intensity noise reduction approaching the standard quantum limit. Additional experimental data indicates that reducing the output coupling from ring-resonator 12 further weakens the side-mode oscillations of fiber-optic ring laser 10 to the point where, for the case of 10% output coupling, fiber-optic ring laser 10 of the present invention shows a quantum limited intensity noise level.

It is to be understood that the foregoing description and accompanying drawings relate only to preferred embodiments of the present invention. Other embodiments may be utilized without departing from the spirit and scope of the invention. For example, a variety of dopant materials may be utilized in the gain medium of the present invention. Also, a semi-conductor-based gain module could be used. Similarly, various methods, other than those discussed herein, of coupling energy into and out of the present invention's ring-resonator may be used. Also, fiber Fabry-Perot filters having characteristics distinctly different from those described herein may be incorporated in the present invention. Accordingly, it is to be further understood that the description and drawings set forth hereinabove are for illustrative purposes only and do not constitute a limitation on the scope of the invention.

What is claimed is:

1. A fiber-optic ring laser having improved side-mode suppression, narrow linewidth and reduced intensity noise comprising:

a ring-resonator including a length of optical fiber, a gain module, first and second fiber Fabry-Perot filters; and a pump source coupled to said ring-resonator to input energy into said ring-resonator to excite said gain module and achieve lasing action in said ring-resonator.

2. A fiber-optic ring laser as in claim 1 wherein said optical fiber is of single-mode configuration.

3. A fiber-optic ring laser as in claim 1 wherein said optical fiber is of single-mode configuration and is polarization maintaining.

4. A fiber-optic ring laser as in claim 1 wherein said first Fabry-Perot filter is a broad-band filter tunable to select said ring-resonator's lasing wavelength and said second fiber Fabry-Perot filter is a narrow-band filter capable of suppressing side-mode oscillations in said ring-resonator.

5. A fiber-optic ring laser as in claim 4 wherein said first fiber Fabry-Perot filter is electronically tunable.

6. A fiber-optic ring laser as in claim 5 wherein said second fiber Fabry-Perot filter is electronically tunable.

7. A fiber-optic ring laser as in claim 4 wherein said ring-resonator's lasing wavelength range extends from approximately 1530 nanometers to approximately 1560 nanometers.

8. A fiber-optic ring laser as in claim 7 wherein said side-mode suppression is at least 60 decibels.

9. A fiber-optic ring laser as in claim 4 wherein said second fiber Fabry-Perot filter is electronically tunable.

10. A fiber-optic ring laser as in claim 4 wherein said side-mode suppression is at least 60 decibels.

11. A fiber-optic ring laser as in claim 4 wherein said intensity noise is reduced to approximately the standard quantum limit.

12. A fiber-optic ring laser as in claim 1 wherein said gain module further comprises a length of rare earth doped fiber.

13. A fiber-optic ring laser as in claim 12 wherein said rare earth is erbium.

14. A fiber-optic ring laser as in claim 1 further comprising means for preventing interetalon interactions between said first and second fiber Fabry-Perot filters.

15. A fiber-optic ring laser as in claim 14 wherein said means for preventing interetalon interactions further comprises an optical isolator.

16. A fiber-optic ring laser as in claim 14 wherein said means for preventing interetalon interactions further comprises a polarization-independent isolator.

17. A fiber-optic ring laser as in claim 1 wherein said ring-resonator further includes a polarization controller and polarizer.

18. A fiber-optic ring laser as in claim 1 wherein said pump source is a diode laser.

19. A fiber-optic ring laser as in claim 1 wherein the output from said pump source is coupled into said ring-resonator through a wavelength division multiplexer.

20. A fiber-optic ring laser as in claim 1 wherein the threshold pump power from said pump source needed to achieve lasing action in said ring-resonator is less than about 14 milliwatts.

21. A fiber-optic ring laser as in claim 1 wherein said gain module further comprises a semi-conductor optical amplifier.

22. A fiber-optic ring laser as in claim 21 wherein said pump source further comprises means for electrically pumping said semi-conductor optical amplifier.

23. A fiber-optic ring laser as in claim 1 wherein said narrow linewidth is less than 4 kHz.

24. A fiber-optic ring laser as in claim 1 further comprising means for coupling said ring-resonator's lasing action out of said ring-resonator.

25. A fiber-optic ring laser having improved side-mode suppression, narrow linewidth and reduced laser intensity noise comprising: a ring-resonator including a length of single-mode optical fiber, a gain module including a length of rare earth-doped fiber, a first fiber Fabry-Perot filter having a broad bandwidth and being electronically tunable, a second fiber Fabry-Perot filter having a narrow bandwidth, and a polarization-independent isolator for preventing interetalon interactions between said first and second fiber Fabry-Perot filters; and a pump source coupled to said ring-resonator to input energy into said ring-resonator to excite said gain module and achieve lasing action in said ring-resonator.

26. A fiber-optic ring laser as in claim 25 wherein said second fiber Fabry-Perot filter is electronically tunable.

27. A fiber-optic ring laser as in claim 25 wherein said ring-resonator further includes a polarization controller and polarizer.

28. A fiber-optic ring laser as in claim 25 wherein said single-mode optical fiber is polarization maintaining.

29. A fiber-optic ring laser as in claim 25 wherein said rare earth is erbium.

30. A fiber-optic ring laser as in claim 25 wherein said pump source is a diode laser.

31. A fiber-optic ring laser as in claim 25 further comprising means for coupling said ring-resonator's lasing action out of said ring-resonator.

32. A fiber-optic ring laser as in claim 25 wherein the threshold pump power from said pump source needed to achieve lasing action in said ring-resonator is less than about 14 milliwatts.

33. A fiber-optic ring laser as in claim 25 wherein said ring-resonator's lasing wavelength range extends from approximately 1530 nanometers to approximately 1560 nanometers.

34. A fiber-optic ring laser as in claim 25 wherein said side-mode suppression is at least 60 decibels.

35. A fiber-optic ring laser as in claim 25 wherein said intensity noise is reduced to approximately the standard quantum limit.

36. A fiber-optic ring laser as in claim 25 wherein said narrow linewidth is less then 4 kHz.

37. A fiber optic ring laser having improved side-mode suppression, narrow linewidth and reduced intensity noise comprising:

a unidirectional, ting-resonator further comprising a length of single-mode fiber, means for coupling optical pumping radiation into said ring-resonator for achieving lasing action therein, and, in the following order corresponding to the direction of travel of radiation in said unidirectional ring-resonator, a first fiber Fabry-Perot filter, a gain module, a second fiber Fabry-Perot filter, and means for coupling said lasing action out of said ring-resonator;

means for preventing interetalon interactions between said first and second fiber Fabry-Perot filters; and an optical pump source having an output directed into said means for coupling optical radiation into said ring-resonator.

38. A fiber-optic ring laser as in claim 37 wherein said means for preventing interetalon interactions further comprises an optical isolator.

39. A fiber-optic ring laser as in claim 37 wherein said means for preventing interetalon interactions further comprises a polarization-independent isolator.

40. A fiber-optic ring laser as in claim 39 wherein said gain module further comprises a length of rare earth-doped fiber.

41. A fiber-optic ring laser as in claim 40 wherein said rare earth is erbium.

42. A fiber-optic ring laser as in claim 37 wherein said gain module further comprises a length of rare earth-doped fiber.

43. A fiber-optic ring laser as in claim 42 wherein said rare earth is erbium.

44. A fiber-optic ring laser as in claim 37 wherein said ring-resonator further includes a polarization controller and polarizer, 45. A fiber-optic ring laser as in claim 37 wherein said first fiber Fabry-Perot filter is a broad-band filter tunable to select said ring-resonator's lasing wavelength and said second fiber Fabry-Perot filter is a narrow-band filter capable of suppressing side-mode oscillations in said ring-resonator, 46. A fiber-optic ring laser as in claim 45 wherein said first Fabry-Perot filter is electronically tunable.

47. A fiber-optic ring laser as in claim 45 wherein said side-mode suppression is at least 60 decibels.

48. A fiber-optic ring laser as in claim 37 wherein said ring-resonator's lasing wavelength range extends from approximately 1530 nanometers to approximately 1560 nanometers, 49. A fiber-optic ring laser as in claim 37 wherein said second fiber Fabry-Perot filter is electronically tunable.

50. A fiber-optic ring laser as in claim 37 wherein said single-mode fiber is polarization-maintaining.

51. A fiber-optic ring laser as in claim 37 wherein said narrow linewidth is less than 4 kHz.

52. A fiber-optic ring laser as in claim 37 wherein the threshold pump power from said optical pump source needed to achieve lasing action in said ring-resonator is less than about 14 milliwatts.

53. A fiber-optic ring laser as in claim 37 wherein said optical pump source is a diode laser.

54. A fiber-optic ring laser as in claim 37 wherein said intensity noise is reduced to approximately the standard quantum limit.

55. A method of fabricating a fiber-optic ring laser having improved side-mode suppression, narrow linewidth and reduced intensity noise comprising:

assembling a unidirectional, ring-resonator including a length of single-mode fiber, a gain module, a first tunable broad-band fiber Fabry-Perot filter and a second narrow-band fiber Fabry-Perot filter;

coupling pumping energy into said ring-resonator to excite said gain module to achieve lasing action in said ring-resonator;

coupling said lasing action of said ring-resonator out of said resonator with an output coupling; and positioning said first and second fiber Fabry-Perot filters in said ring-resonator relative to each other and said output coupling and said gain module so that said second fiber Fabry-Perot filter is interposed between said gain module and said output coupling and said ring laser exhibits improved side-mode suppression and reduced intensity noise.

56. A method of fabricating a fiber-optic ring laser as in claim 55 further comprising preventing interetalon interactions between said first and second fiber Fabry-Perot filters.

57. A tunable optical fiber ring laser, said ring laser comprising:

an optical fiber ring resonator;

means for pumping optical energy into said ring resonator;

a gain module for providing optical gain in said ring resonator;

a fiber Fabry-Perot filter including means for Selectively changing the effective length of said filter to tune both said filter and said ring resonator of said laser;

wherein said means for selectively changing the effective length of said filter includes means responsive to an electrical signal for altering the temperature of said filter.

58. The tunable optical fiber ring laser of claim 57 wherein said gain module includes an erbium doped optical fiber.

59. The tunable optical fiber ring laser of claim 57 wherein said gain module includes an aluminum co-doped erbium fiber.

60. The tunable optical fiber ring laser of claim 57 wherein said means for pumping optical energy into said ring resonator includes a titanium-sapphire laser.

61. The tunable optical fiber ring laser of claim 57 wherein said means for pumping optical energy into said ring resonator includes a wavelength division multiplexer.

62. The tunable optical fiber ring laser of claim 61 wherein said wavelength division multiplexer has a coupling efficiency of substantially fifty percent.

* * * * *